US011967122B2

(12) United States Patent
Laverne et al.

(10) Patent No.: US 11,967,122 B2
(45) Date of Patent: Apr. 23, 2024

(54) CONTEXT AWARE VERIFICATION FOR SENSOR PIPELINES

(71) Applicant: Argo AI, LLC, Pittsburgh, PA (US)

(72) Inventors: Michel H. J. Laverne, Pittsburgh, PA (US); Dane P. Bennington, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 359 days.

(21) Appl. No.: 17/233,720

(22) Filed: Apr. 19, 2021

(65) Prior Publication Data

US 2022/0335251 A1    Oct. 20, 2022

(51) Int. Cl.
| | | |
|---|---|---|
| *G06V 10/25* | (2022.01) | |
| *G06F 18/22* | (2023.01) | |
| *G06T 5/10* | (2006.01) | |
| *G06T 5/50* | (2006.01) | |
| *G06T 7/13* | (2017.01) | |

(52) U.S. Cl.
CPC .............. *G06V 10/25* (2022.01); *G06F 18/22* (2023.01); *G06T 5/10* (2013.01); *G06T 5/50* (2013.01); *G06T 7/13* (2017.01); *G06T 2207/10028* (2013.01); *G06T 2207/30252* (2013.01)

(58) Field of Classification Search
CPC ........ G06V 10/25; G06V 20/58; G06V 20/64; G06F 18/22; G06T 5/10; G06T 5/50; G06T 7/13; G06T 2207/10028; G06T 2207/30252; G06T 7/62
See application file for complete search history.

(56) References Cited

U.S. PATENT DOCUMENTS

| | | |
|---|---|---|
| 7,991,550 B2 | 8/2011 | Zeng |
| 8,930,063 B2 | 1/2015 | Gandhi et al. |
| 9,274,525 B1 | 3/2016 | Ferguson et al. |
| 9,555,740 B1 | 1/2017 | Zhu et al. |
| 10,000,215 B2 | 6/2018 | Chen et al. |
| 10,137,903 B2 | 11/2018 | Tascione et al. |
| 10,262,475 B2 | 4/2019 | Smith |

(Continued)

FOREIGN PATENT DOCUMENTS

| | | |
|---|---|---|
| DE | 102016212195 A1 | 1/2018 |
| EP | 3644279 | 4/2020 |
| KR | 10-2020-0063898 | 6/2020 |

OTHER PUBLICATIONS

International Search Report and Written Opinion of the International Searching Authority directed to related International Patent Application No. PCT/US2022/025360, dated Jul. 29, 2022; 13 pages.

(Continued)

*Primary Examiner* — Pinalben Patel
(74) *Attorney, Agent, or Firm* — Sterne, Kessler, Goldstein & Fox P.L.L.C.

(57) ABSTRACT

Systems, methods, and computer-readable media are disclosed for context aware verification for sensor pipelines. Autonomous vehicles (AVs) may include an extensive number of sensors to provide sufficient situational awareness to perception and control systems of the AV. For those systems to operate reliably, the data coming from the different sensors should be checked for integrity. To this end, the systems and methods described herein may use contextual clues to ensure that the data coming from the different the sensors is reliable.

20 Claims, 8 Drawing Sheets

(56) References Cited

U.S. PATENT DOCUMENTS

| | | | |
|---|---|---|---|
| 10,591,924 B1 | 3/2020 | Ferguson et al. | |
| 10,832,502 B2 | 11/2020 | Levinson et al. | |
| 2010/0253784 A1 | 10/2010 | Oleg | |
| 2014/0169627 A1* | 6/2014 | Gupta | G06T 7/248 |
| | | | 382/103 |
| 2017/0256065 A1* | 9/2017 | Wu | G06T 7/215 |
| 2018/0276326 A1 | 9/2018 | Ur et al. | |
| 2019/0103026 A1* | 4/2019 | Liu | G06V 10/25 |
| 2019/0258251 A1 | 8/2019 | Ditty et al. | |
| 2019/0259178 A1 | 8/2019 | Hafner et al. | |
| 2020/0250837 A1* | 8/2020 | Fagg | G06F 18/253 |
| 2020/0294401 A1 | 9/2020 | Kerecsen | |
| 2020/0357140 A1* | 11/2020 | Kroeger | G06T 7/85 |

OTHER PUBLICATIONS

Changalvala et al. "LiDAR Data Integrity Verification for Autonomous Vehicle", IEEE Access, Sep. 23, 2019, pp. 138018-138031, vol. 7, IEEE Explore, New York, NY.

Chowdhury et al. "Attacks on Self-Driving Cars and Their Countermeasures: A Survey", IEEE Access, Nov. 16, 2020, pp. 207308-207342, vol. 8, IEEE Explore, New York, NY.

Changalvala et al. "LiDAR Data Integrity Verification for Autonomous Vehicle Using 3D Data Hiding", 2019 IEEE Symposium Series on Computational Intelligence (SSCI), Dec. 2019, pp. 1219-1225, IEEE Explore, New York, NY.

* cited by examiner

CONTEXT AWARE VERIFICATION FOR SENSOR PIPELINES

BACKGROUND

An autonomous vehicle (AV) may require an extensive number of sensors to provide sufficient situational awareness to perception and control tasks of the AV. For those tasks to operate reliably, the data coming from the different sensors should be checked for integrity. There are some methods that currently exist which perform such integrity checks. One example method involves using frame counters that may be used to detect if image or video capture performed by a camera of the AV is frozen. However, this method includes the downside that the camera would pass the check even if the camera is facing away in the wrong direction (that is, the check would only fail if data captured by the camera is frozen). Additional methods may include monitoring individual pixel values to check for dead or stuck pixels (which may become complex and scene-dependent), and checksumming the pixel values and injecting test patterns, which may only verify everything downstream of the imager.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure generally relates to, among other things, context aware verification for sensor pipelines (sensor pipelines may generally refer to a flow of data being provided by the sensors). Autonomous vehicles (AVs) may include an extensive number of sensors to provide sufficient situational awareness to perception and control systems of the AV. For those systems to operate reliably, the data coming from the different sensors should be checked for integrity. To this end, the systems and methods described herein may use contextual clues to ensure that the data coming from the different sensors is reliable. The use of contextual clues to verify sensor data may be accomplished using a number of different methods, examples of which may be described in additional detail below. Although reference may be made to specific types of sensors below (for example, cameras or LIDAR systems), the systems and methods described herein may also potentially be applied to any other types of sensors as well (for example, cameras, LIDARs, RADARs, ultrasonic sensors, or any other type of sensor).

Figure 2:
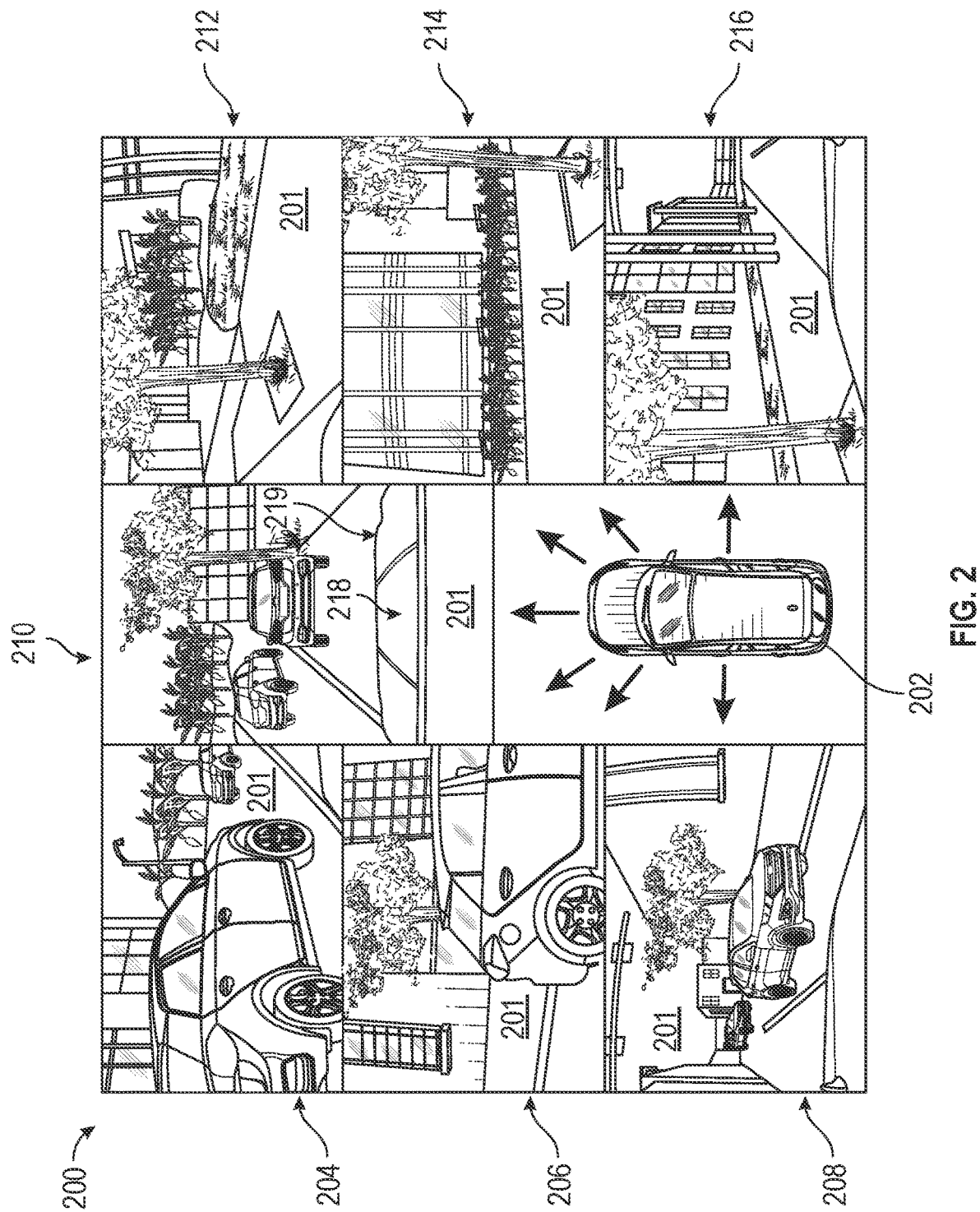
FIG. 2 depicts an example of geometric contextual clues, in accordance with one or more example embodiments of the disclosure.
Figure 4:
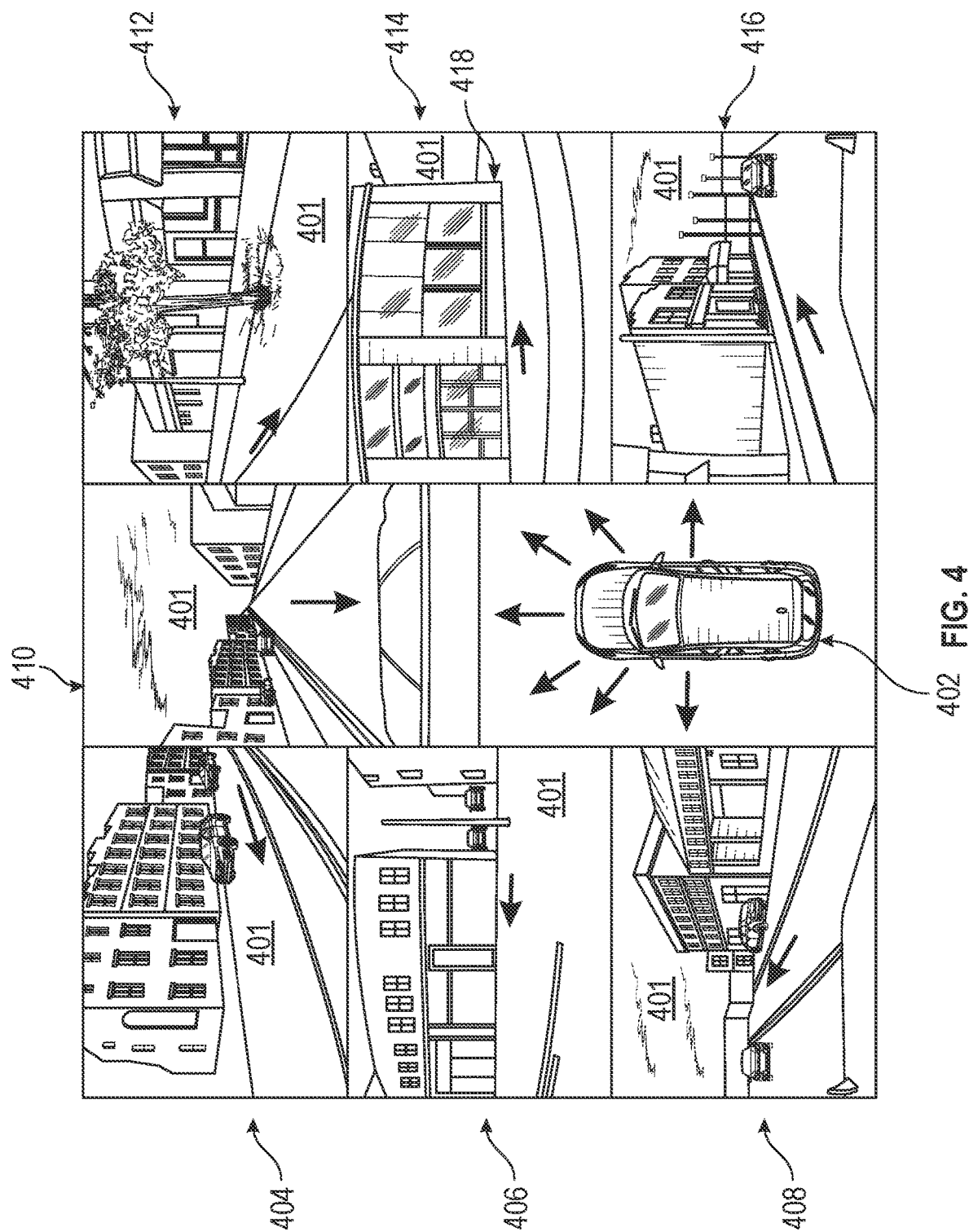
FIG. 4 depicts another example of geometric contextual clues, in accordance with one or more example embodiments of the disclosure.

In some embodiments, a first method that may be used for verifying sensor integrity may include using context clues relating to the location in which portions of the vehicle are included in any captures performed by different cameras of the vehicle. A "portion" of a vehicle may refer to any physical part of the vehicle (for example, body panels, mirrors, etc.). This first method is further illustrated in FIG. 2. A given vehicle may include any number of cameras arranged on the vehicle at different locations on the vehicle and facing different directions away from (or towards) the vehicle. In some instances, the cameras may capture one or more images and/or videos of an environment external to the vehicle (for example, as illustrated in FIGS. 2 and 4). In some cases, capturing images may refer to capturing individual images and/or may also refer to capturing video(s) as videos may comprise a series of images or frames. Thus, any reference to capturing images may also similarly be applicable to capturing videos as well. The vehicle may use the images and/or videos to obtain information about the environment external to the vehicle, and may then use this information to perform certain tasks (for example, may use the information to assist the vehicle in autonomously navigating the environment). In some cases, the direction in which some or all of the cameras are pointed may be fixed such that the cameras may always be pointing in the same direction with respect to the vehicle. With this being the case, if any portion of the vehicle is within the field of view of a particular camera, then that portion of the vehicle should appear at the same location in any subsequent captures performed by the camera. For example, a first camera may be affixed to the front of the vehicle (for example, on the hood, windshield, dashboard, etc.) of the vehicle and may be forward-facing. Given this, a portion of the hood of the vehicle may be included in captures performed by the first camera. If the first camera is fixed, then this portion of the hood should be included in any captures performed by the first camera regardless of the time at which the captures are performed. As a second example, a second camera may be affixed to a rear trunk of the vehicle. Given this, a portion of the trunk of the vehicle may be included in any capture performed by the second camera. If the second camera is fixed, then this portion of the trunk should be included in any captures performed by the second camera regardless of the time at which the captures are performed. These are just two non-limiting examples, and any other cameras may be included on any other portion of the vehicle as well. Additionally, the same may apply even if a given camera is moveable rather than fixed (for example, even if the camera adjusts the direction in which it is facing during operation of the vehicle). For example, a camera may be configured to rotate by a given amount to allow the camera to capture a larger field of view external to the vehicle than if the camera were fixed and pointed in the same direction at all times. If information regarding the movement of the camera is known, then it may be expected that a given portion of the vehicle may be at a particular location within a capture performed by the camera at periodic intervals. For example, the first camera described above may be configured to perform a 90 degree rotation about an imaginary vertical axis. At one end-point of the rotation, the hood of the vehicle may be included at a particular location within a capture performed by the first camera. At another end-point of the rotation, the hood of the vehicle may no longer be included within a capture by the camera, or may only be partially included. If the camera rotates at a constant (or otherwise known) rate and the camera captures images and/or videos at a constant (or otherwise known) rate, then the time intervals at which the hood of the vehicle should be included at the particular location within a capture by the camera may be determined. In such cases, the analysis of captures performed by the camera may be performed at this determined interval to identify if the hood of the vehicle is included in the particular location at the given interval. Similarly, captures between the interval may also be analyzed as well (for example, to determine if the hood is not included in the captures, partially included, or otherwise). It should be noted that while the metric described herein is a location of the portion of the vehicle in a capture by a camera, other parameters may also be used as alternatives to, or in conjunction with, the location information. For example, other parameters such as an apparent size of the portion of the vehicle may also be used.

With the above examples of camera configurations on a vehicle in mind, verification of the data produced by a given camera may be performed using the first method by analyzing captures produced by the given camera. The analysis may involve identifying if a portion of the vehicle that is expected to be at a particular location within a capture by a given camera is actually at that expected location within the capture. In some cases, a baseline image or video may be captured that may be analyzed to determine the expected location of the portion of the vehicle in any captures performed by a given camera. The baseline image or video, or data produced as a result of analyses performed on the image or video, may then be used in subsequent images or videos to determine if the portion of the vehicle in those subsequent images or videos is included in the expected location. The baseline may be established at any given time, such as the initial installation of the camera on the vehicle, before any trip the vehicle takes, after the camera is adjusted by a user, etc. In some cases, the baseline image and/or video itself may not necessarily be used for the analysis, but rather information regarding the location of the portion of the vehicle (or any other information) obtained through the baseline may be used in the analysis instead. Returning again to the first example camera described above: if it is identified that the hood of the vehicle is not included within a capture performed by the first camera, or the hood of the vehicle is included at a different location within a capture than the expected location, then it may be determined that the first camera is producing improper data. Improper data may not necessarily mean that the camera itself is not functioning properly, but may refer to the fact that the camera is no longer facing in the correct direction (however, in some cases these same analyses may be used to identify issues with a camera other than the camera pointing in an incorrect direction as well). For example, the hood of the vehicle may be included at a location in a capture that is not exactly the same as the expected location of the hood, but may be within a threshold distance from the expected location. Additionally, in some cases, a threshold number of captures may need to exhibit the portion of the vehicle being in a location that is not the expected location for it to be determined that a problem exists with the camera.

In some cases, determining a distance between a portion of a vehicle in a first image or video captured by a camera and the same portion of the vehicle in a subsequent image or video captured by the same camera may be performed in a number of different ways. For example, pixel locations associated with all or some of the portion of the vehicle in the first image or video may be compared to pixel locations associated with all or some of the portion of the vehicle in the subsequent images or videos. As a more specific example, pixels associated with an edge of a portion of the vehicle (such as a hood of the vehicle) in the first image or video may be compared to pixels associated with the same edge of the portion of the vehicle in the subsequent images or videos. The example of using an edge of the portion of the vehicle is not intended to be limiting. For example, pixels associated with a center of the portion of the vehicle may also be used, or any other locations on the portion of the vehicle may be used as well. Additionally, the use of pixel comparisons may also be a non-limiting example as well, any other suitable methods may be used to determine a distance between a portion of a vehicle in the first image or video and the portion of the vehicle in the subsequent images or videos.

In some embodiments, the analysis of the captures produced by a given camera may more specifically involve the use of computer vision techniques. More particularly, in some cases, the computer vision techniques may include edge detection, which is a technique that may be used to identify boundaries between objects in an image. At a high level, edge detection may function by identifying pixels in an image or video in which sharp intensity changes exist. Edge detection may also have a number of variations, including, for example, Prewitt edge detection, Sobel edge detection, Laplacian edge detection, or any other suitable edge detection method. The edge detection techniques may be used to identify a boundary between a portion of a vehicle and the external environment. With reference to the example first camera described above, edge detection may be implemented to identify a front edge of the hood of the vehicle in any captures performed by the first camera of the vehicle. That is, edge detection may be used to identify a boundary between the hood of the vehicle and the external environment beyond the hood of the vehicle. If the edge of the hood is determined to consistently remain in the expected location between captures performed by the first camera, then it may be determined that the first camera may be functioning properly and pointed in the correct direction with respect to the vehicle. However, if this edge of the hood changes locations between captures, then it may be determined that the first camera may be producing improper data. This approach may be applied to any other camera pointing in any direction with respect to the vehicle, and including any other portion of the vehicle in any captures performed by a given camera. Additionally, any other suitable computer vision method (or other methods) may be used to identify objects in the captures.

While computer vision techniques may be used to identify whether portions of a vehicle are included in an expected location within a capture performed by a camera of the vehicle, in some situations, the portion of the vehicle may be occluded, or the portions of the vehicle may be otherwise physically adjusted. To name a few non-limiting examples, the vehicle may be covered in snow or a trunk of the vehicle may be partially opened if a driver is transporting goods. In such situations, the computer vision techniques described above may not be able to properly identify that the portion of the vehicle is included within the expected location if the portion of the vehicle is occluded. These situations may need to be distinguished from situations where the portion of the vehicle is actually not included in the expected location because the cameras themselves may not necessarily be providing improper data, but rather that portion of the vehicle itself is occluded such that the computer vision analysis may not be able to be properly performed. Occlusion may be detected when a portion of the vehicle that is expected to be included in a capture is not actually included or only part of the expected object is detected. For instance, snow coverage might completely eliminate the edge the of an object or may only eliminate certain portions of the edge of the object.

Figure 3:
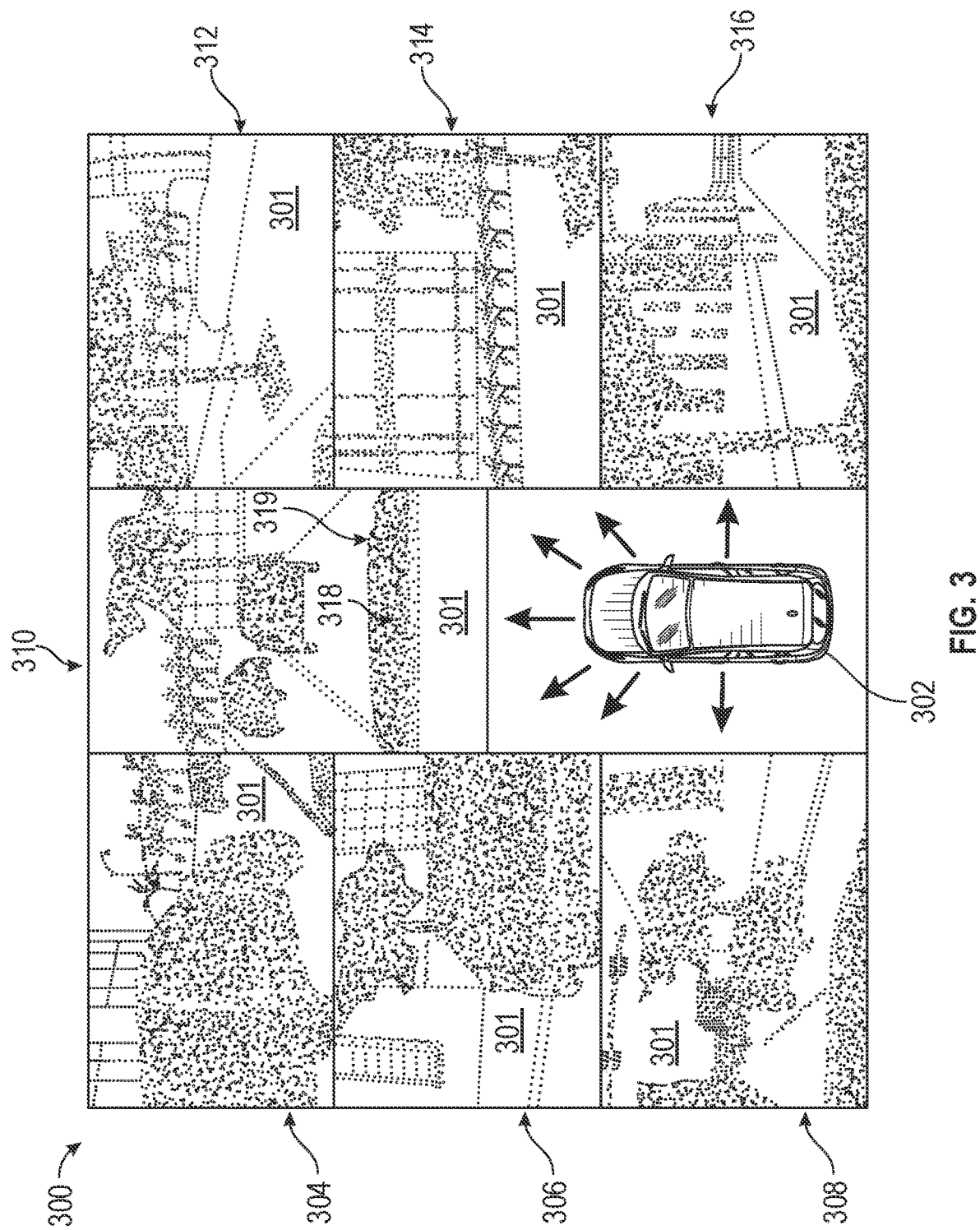
FIG. 3 depicts another example of geometric contextual clues, in accordance with one or more example embodiments of the disclosure.

In some embodiments, a second method of verifying sensor integrity may include using context clues relating to the location of portions of the vehicle in point clouds generated by a Light Detection and Ranging (LIDAR) system (the terms "LIDAR" and "LIDAR system" may be used interchangeably herein) of the vehicle. This second method is illustrated in FIG. 3. This method may be similar to the first method described above, but may be tailored to LIDAR devices rather than cameras (for example, may be tailored to a different type of example sensor). That is, similar to the one or more cameras, one or more LIDAR devices may be affixed to the vehicle. LIDAR systems may be used to ascertain information about objects in an environment external to the LIDAR system by emitting light pulses into the environment. When a return light pulse is detected at the LIDAR system, the LIDAR system may be able to determine that an object exists in the environment in the direction that the light pulse was emitted. Additionally, the LIDAR system may be able to determine a distance the object is from the LIDAR system based on the amount of time between the light pulse being emitted and the return light pulse being detected (for example, the "Time of Flight" (ToF) of the light pulse). A detected return light pulse may be saved as a point. The point may be a single point that serves as a digital representation of a location from which the return light was reflected back to the LIDAR system (for example, based on the determined ToF of that particular light pulse). The LIDAR system may continuously emit and detect light pulses, which may result in a large number of such points being generated by the LIDAR system. A collection of such points may be referred to as a "point cloud," and such point clouds may provide information about the object in the environment. For example, the point clouds may provide an indication of a size and/or a shape of one or more objects in the environment. That is, an ideal point cloud (a high quality point cloud) may be a collection of points that may be in the shape and/or size of the object from which the light pulses are being reflected. For example, if the LIDAR system is emitting light pulses towards a tree in the environment, then an ideal point cloud may be a collection of points that as a whole form the shape of the tree.

In some embodiments, the analyses performed in conjunction with the second method may also be similar to the analyses performed in conjunction with the first method, but may involve analyzing point clouds instead of images and/or videos. Continuing the same example above relating to the first camera and the hood of the vehicle, a LIDAR system may also be configured to be forward-facing with respect to the vehicle (or may rotate such that the LIDAR system may periodically be forward-facing). Instead of the hood being included in images and/or videos, the hood may instead be identifiable as a cluster of points in a point cloud generated using the LIDAR system Similar to the condition that the hood should be present in any captures performed by the first camera, the hood should be present (as a cluster of points) at the same location in any point clouds generated by the LIDAR system.

In some embodiments, a third method of verifying sensor integrity may involve analyzing captures produced by a given camera on the vehicle to track an "optical flow" of the captures. Tracking the optical flow of the captures may involve tracking information relating to how certain features captured in an image or video by a camera move over time (for example, change location within subsequent captures over time). A feature may be any element that may be included within a capture, such as a specific object, a group of objects, or any other element down to the individual pixel level. For example, in a first capture at a first time, a tree may be included at a first location that is closer to a left hand side of the capture. Continuing the example, in a second capture at a second time, the tree may instead be included at a second location that is closer to the right hand side of the capture. If the camera performing the captures is on the right hand side of the vehicle, then this change in location of the tree between captures may indicate that the vehicle is traveling forward and the tree is becoming more distant at the vehicle passes by the tree. If information about the movement of the vehicle (for example, a direction of travel, a current speed, etc.) is known, then the optical flow present across subsequent captures may be analyzed to determine if the actual optical flow matches what an expected optical flow would be given the orientation of a camera and the movement of the vehicle. This analysis may be performed for any cameras on the vehicle that are pointed in any given direction. As another non-limiting example, if a camera is rear-facing on the vehicle and the vehicle is moving forward, then non-moving objects (again, a tree may be used as an example) may be tracked across subsequent captures to determine if they appear to be becoming smaller in subsequent captures and/or appearing closer to the top portion of the captures. These are just a few non-limiting examples, and captures produced by any cameras of the vehicle may be analyzed in any other suitable manner to identify if the actual optical flow present in captures by the camera matches an expected optical flow.

In some embodiments, the optical flow determinations made with respect to the third method may more specifically involve establishing one or more vectors that may represent the optical flow of features that are included within the captures. A vector may begin at a location of a feature in one capture and may end at a location of the same feature in a subsequent capture. The vector may have an associated magnitude and direction (for example, an angle) that may be used in the analysis of the captures being produced by a camera to determine if the camera is producing proper data. For example, an angle of the vector may be compared to an expected angle. If the actual angle of the vector is different than the expected angle by more than a threshold amount, then it may be determined that the camera is producing improper data. In some cases, multiple vectors between one feature in subsequent captures or multiple different features may also be created. Using multiple vectors may serve as further validation to avoid false indications that a camera is not producing proper data. For example, if it is determined that an angle of vectors for multiple features in the captures are different than their corresponding expected vectors by greater than a threshold amount, then this may provide a stronger indication that the camera is producing improper data than if only one vector for one feature were used.

In some embodiments, if it is determined through any of the sensor integrity verification methods (as described above or otherwise) that a particular sensor may be producing improper data, then one or more actions may be triggered. A first example action may include turning off the particular sensor that is producing the improper data. For example, if the sensor that is producing improper data is a camera, then the camera may be turned off so that improper data is not provided to the vehicle by the camera. However, in this case, the remaining cameras (if they are providing proper data) may remain turned on. Additionally, in some cases, the other cameras may be adjusted such that they may compensate for the particular camera being turned off. For example, the direction that some or all of the other cameras are facing may be adjusted to capture at least some of the field of view that was previously captured by the camera that was turned off. This may also apply to any other type of sensor as well. For example, if it is determined that an ultrasonic sensor is producing improper data then that particular sensor may also be disabled (and/or other ultrasonic sensors may be used to compensate for the particular ultrasonic sensor being disabled). Furthermore, in some cases, different types of sensors than the sensor that was disabled may also be used to compensate for the sensor that was disabled. For example, if a camera is disabled, then a LIDAR device may be used to provide data pertaining to the field of view that the camera was capturing.

A second example action may include keeping the sensor active, but using data relating to the issue with the sensor in order to perform post-processing on any data output by that particular sensor. For example, if the first method described above is used, information pertaining to the difference between the actual location of the portion of the vehicle and the expected location of the portion of the vehicle may be used to post-process any data produced by that particular camera. Continuing the example, if it is determined that the hood of the vehicle actually appears slightly lower in a capture than an expected location of the hood, then it may be determined that the camera is pointing more upward than it should be. This information may be used to post-process any data produced by the camera to ensure that the discrepancy in the direction the camera is pointing is taken into account by the vehicle.

A third example action may include providing a warning to a user of the vehicle. The warning may be any type of warning, such as an auditory or visual warning, for example. The type of warning provided may also differ depending on the level of discrepancy between actual data produced by a sensor and expected data. A fourth example action may include disabling a feature of the vehicle and/or stopping the vehicle. For example, if a side camera is required to produce proper data for the vehicle to perform automatic lane changes, and the side camera is producing improper data, then the automatic lane change feature may be disabled. If it is determined that the vehicle may not be able to properly function, then the vehicle may proceed to a location where it can turn off and may halt movement. These four examples provided above are not intended to be limiting, and any other actions may also be taken in response to a determination that a camera is producing improper data.

Figure 1:
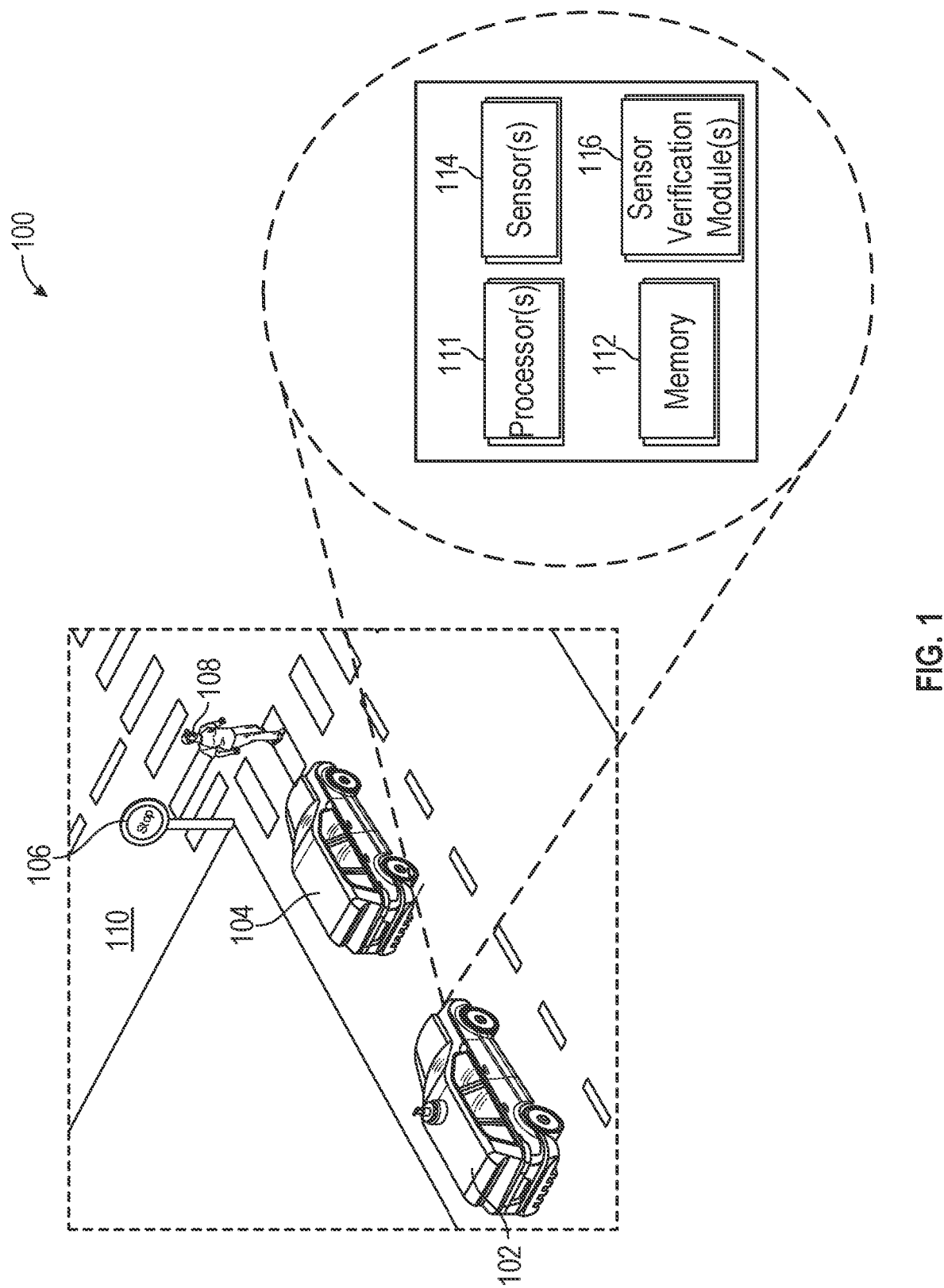
FIG. 1 depicts a schematic illustration of an example system, in accordance with one or more example embodiments of the disclosure.

Turning to the figures, FIG. 1 includes a schematic diagram of an example system 100, in accordance with one or more embodiments of this disclosure. In some embodiments, the system 100 may include one or more vehicles (for example, vehicle 102, vehicle 104, and/or any other vehicle). Any of the vehicles may navigate an environment 110 that may include other objects, such as, for example, a stop sign 106 or a pedestrian 108 (as well as any other types of objects).

In some embodiments, a vehicle (such as vehicle 102, vehicle 104, or any other vehicle) may include one or more processor(s) 111, memory 112, one or more sensor(s) 114, and/or one or more sensor verification module(s) 116. The one or more processor(s) 111 and memory 112 may be described in further detail with respect to the computing device 800 of FIG. 8. Additionally, a vehicle may also include any other elements described with respect to the computing device 800 of FIG. 8 that are not depicted in FIG. 1, or any other elements not described herein. The one or more sensor(s) 114 may be any sensors incorporated in the vehicle, such as, for example, cameras, LIDARs, RADARs, ultrasonic sensors, temperature sensors, or any other type of sensor. The one or more sensor(s) 114 may capture information about a vehicle and/or the environment 110 external to the vehicle. This information may be used by the vehicle to perform certain functions, such as autonomously navigating the environment 110. In some cases, some or all of the sensor(s) 114 may produce improper data. Given this, the systems and methods described herein may analyze data being produced by any of the sensor(s) 114 of the vehicle. This analysis may be performed, for example, by the one or more sensor verification module(s) 116. The one or more sensor verification module(s) 116 may implement any of the methods described below for verifying data produced by the sensor(s) 114, such as the first example method (described with respect to FIG. 2), the second example method (described with respect to FIG. 3), and/or the third example method (described with respect to FIG. 4), as well as any other suitable method.

FIG. 2 depicts an example illustration 200 of geometric contextual clues. The illustration 200 may provide a reference illustration for the first method that may be used for verifying sensor integrity as mentioned above. The illustration 200 may depict a vehicle 202 (which may be the same as vehicle 102, or any other vehicle). The vehicle 202 may include seven different cameras (not depicted in the figure) that may produce seven different fields of view (for example, a first camera may produce field of view 204, a second camera may produce field of view 206, a third camera may produce field of view 208, a fourth camera may produce field of view 210, a fifth camera may produce field of view 212, a sixth camera may produce field of view 214, and a seventh camera may produce field of view 216) of an external environment 201 around the vehicle 202. Some or all of the cameras may capture one or more images and/or videos of their respective fields of view of the external environment 201 as the vehicle 202 travels through the external environment 201. This may only be one example of a vehicle configuration, and the vehicle 202 may likewise include any other number of cameras (and/or other sensors) facing in any number of directions.

In some embodiments, the vehicle 202 may use the images and/or videos to obtain information about the external environment 201, and may use this information to perform certain tasks (for example, may use the information to assist the vehicle 202 in navigating the environment). In some cases, some or all of the cameras may be fixed such that they may always be pointing in the same direction with respect to the vehicle 202. With this being the case, if any portion of the vehicle 202 is within the field of view of a camera, then this portion of the vehicle should appear at the same location in any subsequent captures performed by the camera. For example, a first camera may be affixed to the front of the vehicle (for example, on the hood, windshield, dashboard, etc.) of the vehicle and may be forward-facing (for example, the camera associated with field of view 210). Given this, a portion of the hood 218 of the vehicle may be included in captures performed by the first camera. If the first camera is fixed, then this portion of the hood 218 should be included in any captures performed by the first camera regardless of the time at which the captures are performed. This is just one non-limiting example, and any other cameras may be included on any other portion of the vehicle as well. Additionally, the same may apply even if a given camera is moveable rather than fixed (for example, even if the camera adjusts the direction in which it is facing during operation of the vehicle). For example, the camera may be configured to rotate by a given amount to allow the camera to capture a greater field of view external to the vehicle 202 than if the camera were fixed and pointed in the same direction at all times. If information regarding the movement of the camera is known, then it may be expected that a given portion of the vehicle 202 may be at a particular location within a capture performed by the camera at periodic intervals. For example, the first camera described above may be configured to perform a 90 degree rotation about an imaginary vertical axis. At one end-point of the rotation, the hood 218 of the vehicle 202 may be included at a particular location within a capture performed by the first camera. At another end-point of the rotation, the hood 218 of the vehicle 202 may no longer be included within a capture by the camera, or may only be partially included. If the camera rotates at a constant (or otherwise known) rate and the camera captures images and/or videos at a constant (or otherwise known) rate, then the time intervals at which the hood 218 of the vehicle 202 should be included at the particular location within a capture by the camera may be determined. In such cases, the analysis of captures performed by the camera may be performed at this determined interval to identify if the hood 218 of the vehicle 202 is included in the particular location at the given interval. Similarly, captures between the intervals may also be analyzed as well (for example, to determine if the hood is not included in the captures, partially included, or otherwise). It should be noted that while the metric described herein is a location of the portion of the vehicle 202 in a capture by a camera, other parameters may also be used as alternatives to, or in conjunction with, the location information. For example, other parameters such as an apparent size of the portion of the vehicle 202 may also be used.

With the above examples of camera configurations on a vehicle 202 in mind, verification of the data produced by the cameras may be performed using the first method by analyzing captures produced by a given camera. The analysis may involve identifying if a portion of the vehicle 202 that is expected to be included at a particular location within a capture by a given camera is actually included at that location in the capture. In some cases, a baseline image or video may be captured that may be analyzed to determine the expected location of the portion of the vehicle 202 in any captures performed by a given camera. The baseline image or video, or data produced as a result of the analyses performed on the image or video, may then be used in subsequent images or videos to determine if the portion of the vehicle 202 in those subsequent images or videos is included in the expected location. The baseline may be established at any given time, such as the initial installation of the camera on the vehicle 202, before any trip the vehicle takes, after the camera is adjusted by a user, etc. Returning again to the first example camera described above, if it is identified that the hood 218 of the vehicle 202 is not included within a capture performed by the first camera, or the hood 218 of the vehicle 202 is included at a different location within a capture than the expected location, then it may be determined that the first camera is producing improper data. Improper data may be produced by a camera for any given number of reasons. For example, the physical position of the camera may have been altered such that the camera is no longer pointing in the same direction. In some cases, a margin of error may be used when analyzing the captures. For example, the hood of the vehicle may be included at a location in a capture that is not exactly the same as the expected location of the hood, but may be within a threshold distance from the expected location. Additionally, in some cases, a threshold number of captures may need to exhibit the portion of the vehicle being in a location that is different from the expected location for it to be determined that a problem exists with the camera.

In some embodiments, the analysis of the captures produced by a given camera may more specifically involve the use of computer vision techniques. The computer vision techniques may also be performed using artificial intelligence, such as machine learning, deep learning, or the like. More particularly, in some cases, the computer vision techniques may include edge detection, which is a technique that may be used to identify boundaries between objects in an image. At a high level, edge detection may function by identifying pixels in an image or video in which sharp intensity changes exist. Edge detection may also have a number of variations, including, for example, Prewitt edge detection, Sobel edge detection, Laplacian edge detection, or any other suitable edge detection method. The edge detection techniques may be used to identify a boundary between a portion of a vehicle 202 and the external environment 201. With reference to the example first camera described above, edge detection may be implemented to identify a front edge 219 of the hood 218 of the vehicle 202 in any captures performed by the first camera of the vehicle. That is, edge detection may be used to identify a boundary between the hood 218 of the vehicle 202 and the external environment 201 beyond the hood 218 of the vehicle 202. If the edge 219 of the hood 202 is determined to consistently remain in the expected location between captures performed by the first camera, then it may be determined that the first camera may be functioning properly and pointed in the correct direction with respect to the vehicle 202. However, if this edge of the hood changes locations between captures, then it may be determined that the first camera may be producing improper data. This approach may be applied to any other camera pointing in any direction with respect to the vehicle 202, and including any other portion of the vehicle in any captures performed by a given camera. Edge detection is just one non-limiting example of a method by which the portion of the vehicle may be identified. For example, computer vision may also be used to identify a center point of the portion of the vehicle, or the entirety of the portion of the vehicle as well. For example, if the portion of the vehicle is a hood of the vehicle, computer vision may be used to identify the entirety of the hood that is included in the image or video rather than just the edge of the hood. Additionally, while examples may be provided herein that specifically reference identifying a hood of the vehicle, any other portion of the vehicle may similarly be used as well (for example, side mirrors, latches, antennae, doors, body panels, etc.).

FIG. 3 depicts an example illustration 300 of geometric contextual clues. The illustration 300 may provide a reference illustration for the second method that may be used for verifying sensor integrity as mentioned above. The illustration 300 may depict a vehicle 302 (which may be the same as vehicle 102, vehicle 202, or any other vehicle described herein). The second method of verifying sensor integrity may include using context clues relating to the location of portions of the vehicle in point clouds generated by a LIDAR system of the vehicle. This method may be similar to the first method described above, but may be tailored to LIDAR devices rather than cameras (for example, may be tailored to a different type of example sensor). That is, similar to the one or more cameras, one or more LIDAR devices may be affixed to the vehicle. LIDAR systems may be used to ascertain information about objects in an environment 301 external to the LIDAR system by emitting light pulses into the environment 301. The figure may depict similar fields of view as FIG. 2 (for example, fields of view 304, 306, 308, 310, 312, 314, and/or 316). However, whereas the fields of view illustrated in FIG. 2 may correspond to fields of view of different cameras, the fields of view illustrated in FIG. 3 may be captured by a single rotating LIDAR system on the vehicle, or multiple LIDAR systems.

In some instances, when a return light pulse is detected at the LIDAR system, the LIDAR system may be able to determine that an object exists in the environment 301 in the direction that the light pulse was emitted. Additionally, the LIDAR system may be able to determine a distance the object is from the LIDAR system based on the amount of time between the light pulse being emitted and the return light pulse being detected (for example, the "Time of Flight" (ToF) of the light pulse). A detected return light pulse may be saved as a point. The point may be a single point that serves as a digital representation of a location from which the return light was reflected back to the LIDAR system (for example, based on the determined ToF of that particular light pulse). The LIDAR system may continuously emit and detect light pulses, which may result in a large number of such points being generated by the LIDAR system. A collection of such points may be referred to as a "point cloud," and such point clouds may provide information about the object in the environment. For example, the point clouds may provide an indication of a size and/or a shape of one or more objects in the environment. That is, an ideal point cloud (a high quality point cloud) may be a collection of points that may be in the shape and/or size of the object from which the light pulses are being reflected. For example, if the LIDAR system is emitting light pulses towards a tree in the environment, then an ideal point cloud may be a collection of points that as a whole form the shape of the tree.

In some embodiments, the analyses performed in conjunction with the second method may also be similar to the analyses performed in conjunction with the first method, but may involve analyzing point clouds instead of images and/or videos. Continuing the same example above relating to the first camera and the hood 318 of the vehicle, a LIDAR system may also be configured to be forward-facing with respect to the vehicle (or may rotate such that the LIDAR system may periodically be forward-facing). Instead of the hood 318 being included in images and/or videos, the hood 318 may instead be identifiable as a cluster of points in a point cloud generated using the LIDAR system Similar to the condition that the hood 318 should be present in any captures performed by the first camera, the hood 318 should be present (as a cluster of points) at the same location in any point clouds generated by the LIDAR system.

FIG. 4 depicts an example illustration 400 of geometric contextual clues. The illustration 400 may provide a reference illustration for the third method that may be used for verifying sensor integrity as mentioned above Similar to the illustration 200 presented in FIG. 2, the illustration 400 may depict a vehicle 402 (which may be the same as vehicle 102, vehicle 202, or any other vehicle). The vehicle 402 may include seven different cameras (not depicted in the figure) that may produce seven different fields of view (for example, a first camera may produce field of view 404, a second camera may produce field of view 406, a third camera may produce field of view 408, a fourth camera may produce field of view 410, a fifth camera may produce field of view 412, a sixth camera may produce field of view 414, and a seventh camera may produce field of view 416) of an external environment 401 around the vehicle 402. Some or all of the cameras may capture one or more images and/or videos of their respectively fields of view of the external environment 401 as the vehicle 402 travels through the external environment 402. This may only be one example of a vehicle configuration, and the vehicle 402 may likewise include any other number of cameras (and/or other sensors) facing in any number of directions.

In some embodiments, the third method of verifying sensor integrity may involve analyzing captures produced by a given camera on the vehicle 402 to track an "optical flow" of the captures. Tracking the optical flow of the captures may involve tracking information relating to how certain features (or some or all of the features in a field of view of a camera as a whole) captured in an image or video by a camera move over time. A feature may be any element that may be included within a capture, such as a specific object, a group of objects, or any other element down to the individual pixel level. For example, in a first capture at a first time, a building 418 may be included at a first location that is closer to a left hand side of the capture. Continuing the example, in a second capture at a second time, the building 418 may instead be included at a second location that is closer to the right hand side of the capture. If the camera performing the captures is on the right hand side of the vehicle, then this change in location of the building 418 between captures may indicate that the vehicle 402 is traveling forward and the building 418 is becoming more distant at the vehicle 402 passes by the building 418. If information about the movement of the vehicle (for example, a direction of travel, a current speed, etc.) is known, then the optical flow present across subsequent captures may be analyzed to determine if the actual optical flow matches what an expected optical flow would be given the orientation of a camera and the movement of the vehicle 402. This analysis may be performed for any cameras on the vehicle 402 that are pointed in any given direction. As another non-limiting example, if a camera is rear-facing on the vehicle 402 and the vehicle is moving forward, then non-moving objects (again, a tree may be used as an example) may be tracked across subsequent captures to determine if they appear to be becoming smaller in subsequent captures and/or appearing closer to the top portion of the captures. These are just a few non-limiting examples, and captures produced by any cameras of the vehicle 402 may be analyzed in any other suitable manner to identify if the actual optical flow present in captures by the camera matches an expected optical flow.

In some embodiments, the optical flow determinations made with respect to the third method may more specifically involve establishing one or more vectors that may represent the optical flow of features that are included within the captures. A vector may begin at a location of a feature in one capture and may end at a location of the same feature in a subsequent capture. The vector may have an associated magnitude and direction (for example, an angle) that may be used in the analysis of the captures being produced by a camera to determine if the camera is producing proper data. For example, an angle of the vector may be compared to an expected angle. If the actual angle of the vector is different than the expected angle by more than a threshold amount, then it may be determined that the camera is producing improper data. In some cases, multiple vectors between one feature in subsequent captures or multiple different features may also be created. Using multiple vectors may serve as further validation to avoid false indications that a camera is not producing proper data. For example, if it is determined that an angle of vectors for multiple features in the captures are different than their corresponding expected vectors by greater than a threshold amount, then this may provide a stronger indication that the camera is producing improper data than if only one vector for one feature were used.

Figure 5:
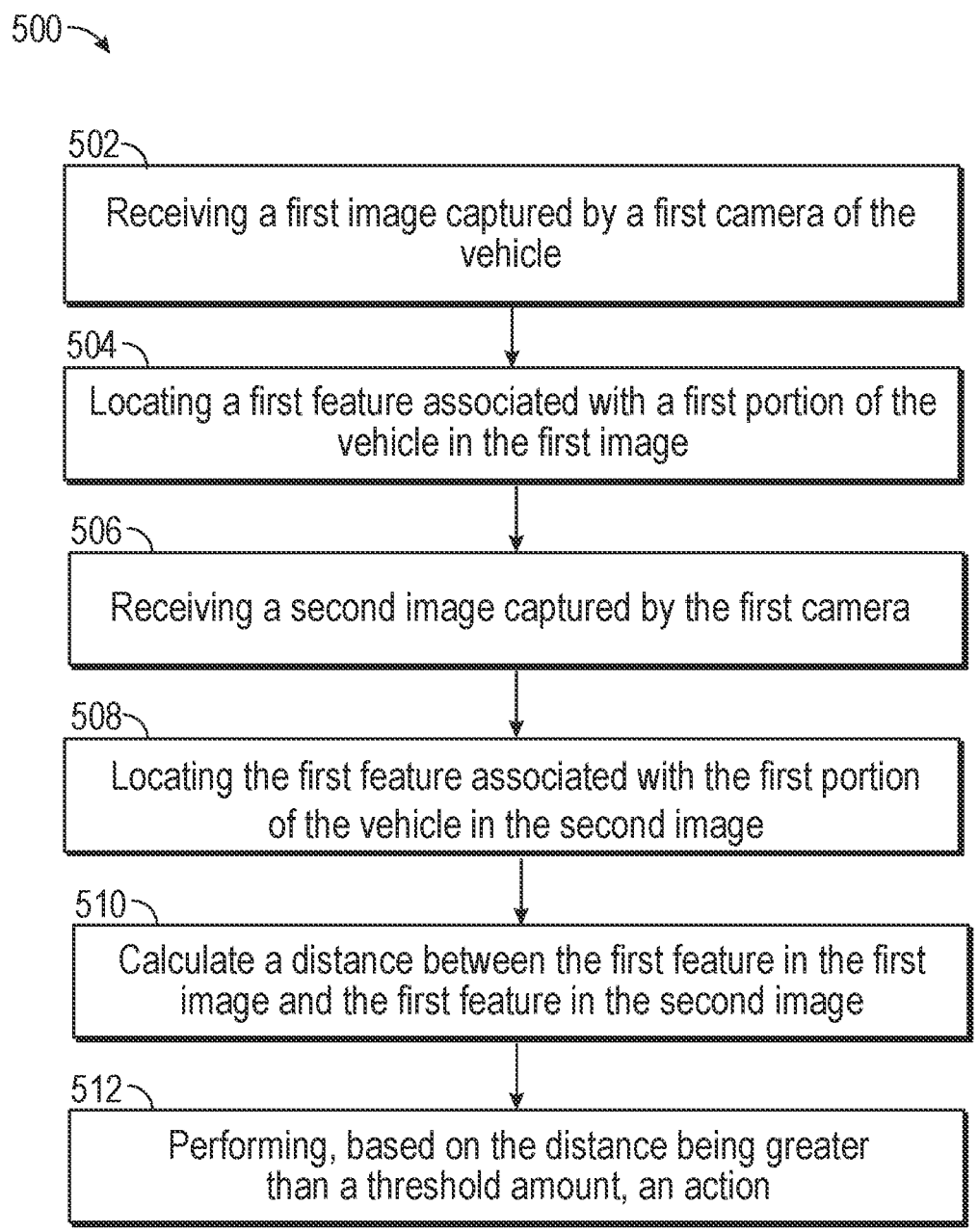
FIG. 5 depicts an example method, in accordance with one or more example embodiments of the disclosure.

FIG. 5 is an example method 500. At block 502 of the method 500 in FIG. 5, the method may include receiving a first image captured by a first camera of the vehicle. Block 504 of the method 500 may include locating a first feature associated with a first portion of the vehicle in the first image. Block 506 of the method 500 may include receiving a second image captured by the first camera. Block 508 of the method 500 may include locating the first feature associated with the first portion of the vehicle in the second image. Block 510 of the method 500 may include calculating a distance between the first feature in the first image and the first feature in the second image. Block 512 of the method 500 may include perform, based on the distance being greater than a threshold amount, an action.

In some embodiments, the method 500 may also include receiving a third image captured by a second camera of the vehicle. The method 500 may also include locating a second feature associated with a second portion of the vehicle in the third image; receive a fourth image captured by the second camera. The method 500 may also include locating the second feature associated with the second portion of the vehicle in the fourth image. The method 500 may also include calculating a distance between the second feature in the third image and the second feature in the fourth image. The method 500 may also include performing, based on the distance being greater than a threshold amount, an action.

In some embodiments, the action includes at least one of: providing a warning to a user, turning off the first camera, filtering out subsequent images or videos received from the first camera, or storing the distance. In some embodiments, the instructions operable to locate the first feature include instructions to perform edge detection on the first image.

In some embodiments, the method 500 may also include receive, based on data captured by a LIDAR system of the vehicle, a first point cloud. The method 500 may also include storing data indicating a third location where a first portion of the vehicle is included within the first point cloud. The method 500 may also include receiving, based on data captured by the LIDAR system, a second point cloud. The method 500 may also include comparing a fourth location of the first portion of the vehicle included within the second point cloud to the third location of the first portion of the vehicle included within the first point cloud. The method 500 may also include calculating a distance between the third location and fourth location. The method 500 may also include performing, based on difference being greater than a threshold amount, an action.

In some embodiments, the method 500 may also include receiving a fifth image captured by the first camera at a first time. The method 500 may also include identifying a first location of an object within the fifth image. The method 500 may also include receiving a sixth image captured by the first camera at a second time, where the second time is after the first time. The method 500 may also include identifying a second location of the object within the sixth image. The method 500 may also include determining, based on a direction of travel of the vehicle, a first vector representing a directional difference between the first location of the object in the fifth image and an expected location of the object in the sixth image. The method 500 may also include comparing the first vector to a second vector representing a directional difference between the first location of the object in the fifth image and the second location of the object in the sixth image. The method 500 may also include calculating a difference between the first vector and second vector. The method 500 may also include performing, based on difference being greater than a threshold amount, an action. The method 500 may also include identifying occlusion in the first image based on a part of the first portion of the vehicle being included in the first image.

Figure 6:
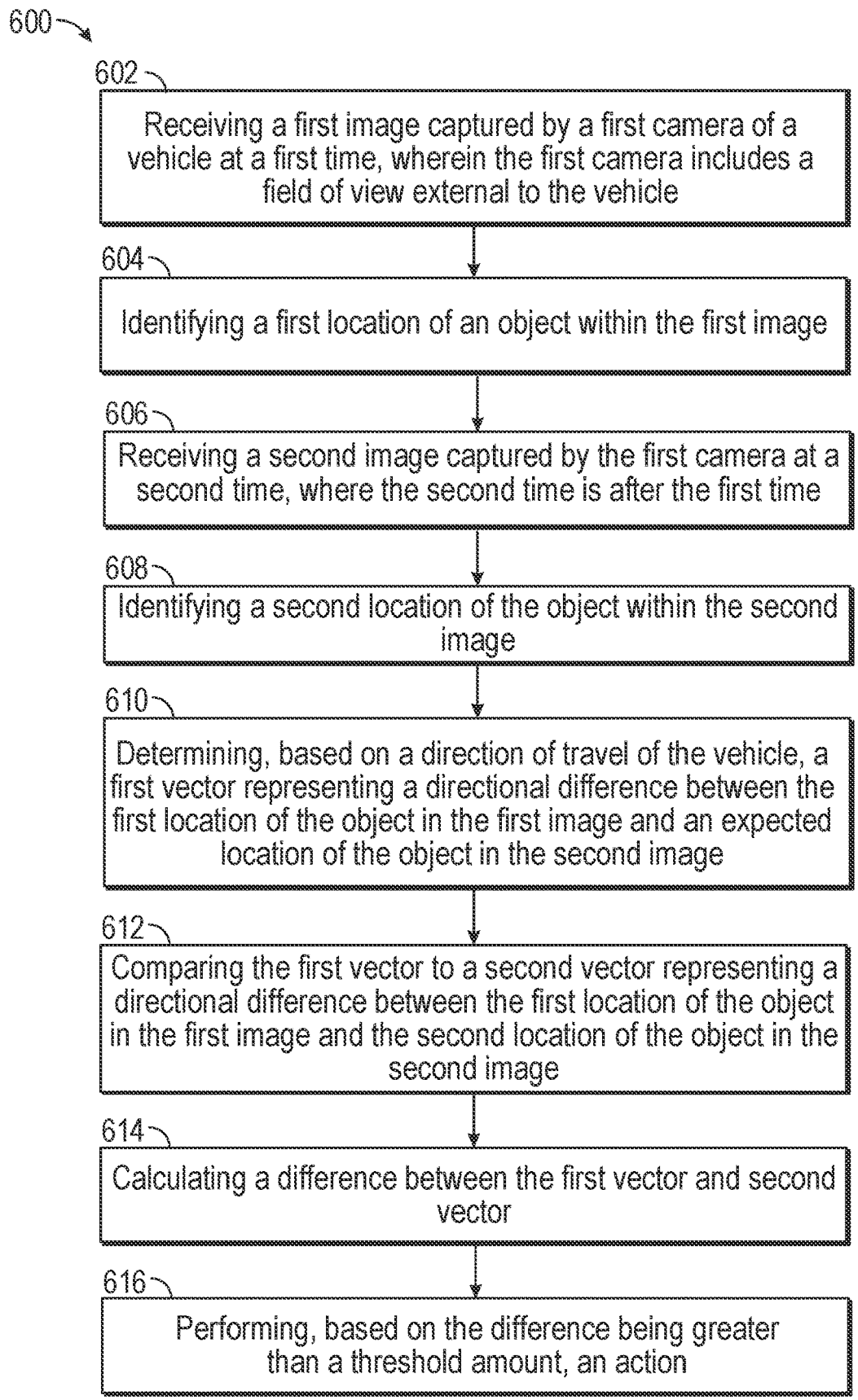
FIG. 6 depicts an example method, in accordance with one or more example embodiments of the disclosure.

FIG. 6 is an example method 600. At block 602 of the method 600 in FIG. 6, the method may include receiving a first image captured by a first camera of a vehicle at a first time, wherein the first camera includes a field of view external to the vehicle. At block 604, the method 600 may include identifying a first location of an object within the first image. At block 606, the method 600 may include receiving a second image captured by the first camera at a second time, where the second time is after the first time. At block 608, the method 600 may include identifying a second location of the object within the second image. At block 610, the method 600 may include determining, based on a direction of travel of the vehicle, a first vector representing a directional difference between the first location of the object in the first image and an expected location of the object in the second image. At block 612, the method 600 may include comparing the first vector to a second vector representing a directional difference between the first location of the object in the first image and the second location of the object in the second image. At block 614, the method 600 may include calculating a difference between the first vector and second vector. At block 616, the method 600 may include performing, based on the difference being greater than a threshold amount, an action.

In some embodiments, the action includes at least one of: providing a warning to a user, turning off the first camera, filtering out subsequent images or videos received from the first camera, or storing the difference between the first location and second location. In some embodiments, the first location where the first portion of the vehicle is included within the first image is obtained by performing edge detection on the first image.

In some embodiments, the method 600 may also include receiving, based on data captured by a LIDAR system of the vehicle, a first point cloud. The method 600 may also include store data indicating a third location where a first portion of the vehicle is included within the first point cloud. The method 600 may also include receiving, based on data captured by the LIDAR system, a second point cloud. The method 600 may also include comparing a fourth location of the first portion of the vehicle included within the second point cloud to the third location of the first portion of the vehicle included within the first point cloud. The method 600 may also include calculating a distance between the third location and fourth location. The method 600 may also include performing, based on difference being greater than a threshold amount, an action.

In some embodiments, the method 600 may also include receiving a third image captured by the first camera of the vehicle. The method 600 may also include locating a first feature associated with a first portion of the vehicle in the third image; receiving a fourth image captured by the first camera. The method 600 may also include locating the first feature associated with the first portion of the vehicle in the fourth image. The method 600 may also include calculating a distance between the first location of the first feature in the third image and the second location of the first feature in the fourth image. The method 600 may also include performing, based on the distance being greater than a threshold amount, an action.

In some embodiments, the method 600 may also include receiving a third image captured by a second camera of the vehicle. The method 600 may also include locating a second feature associated with a second portion of the vehicle in the third image. The method 600 may also include receiving a fourth image captured by the second camera. The method 600 may also include locating the second feature associated with the second portion of the vehicle in the fourth image. The method 600 may also include calculating a distance between the second feature in the third image and the second feature in the fourth image. The method 600 may also include performing, based on the distance being greater than a threshold amount, an action. The method 600 may also include identifying occlusion in the first image or first video based on only a part of the object being included in the first image.

Figure 7:
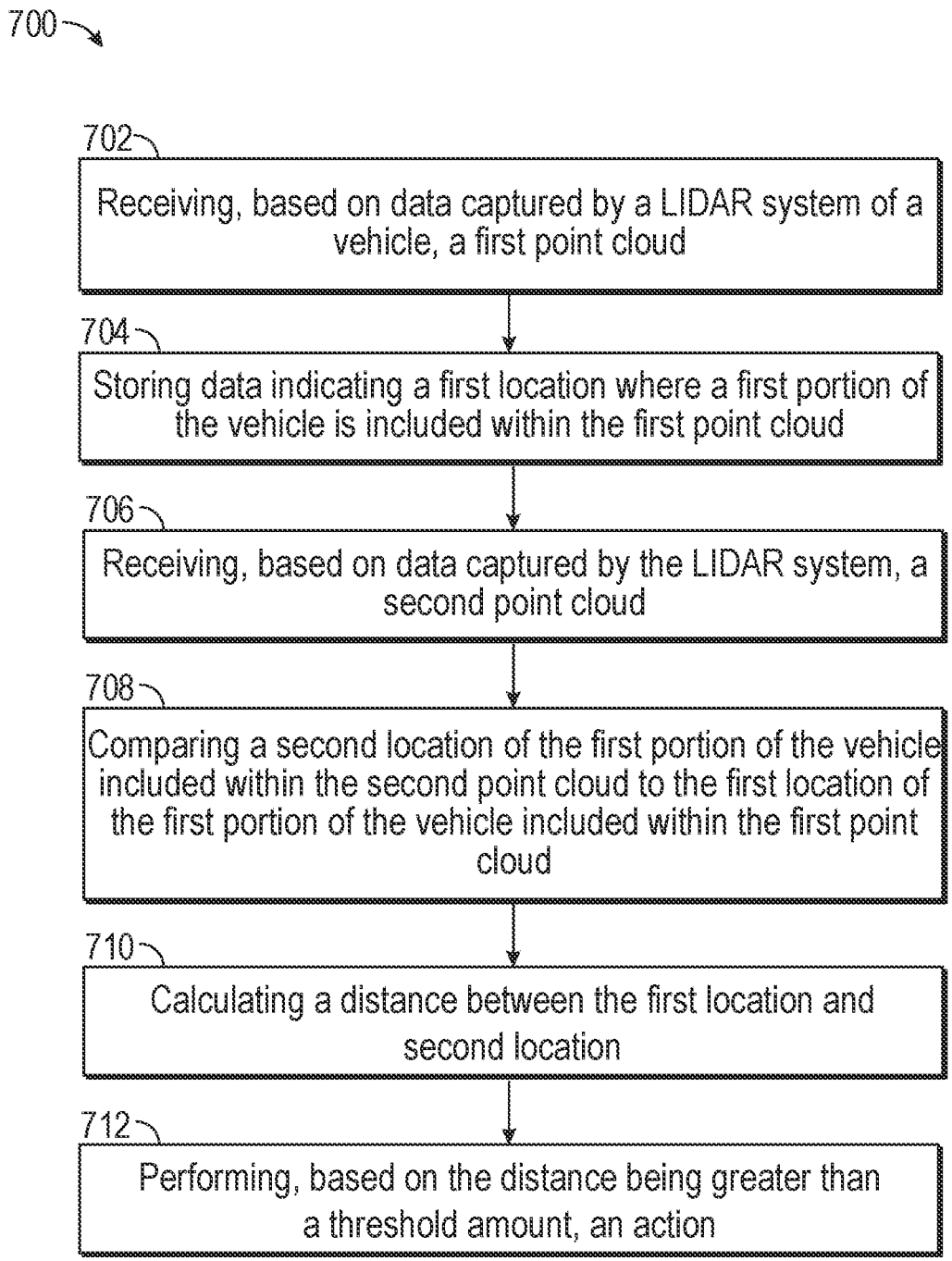
FIG. 7 depicts an example method, in accordance with one or more example embodiments of the disclosure.

FIG. 7 is an example method 700. At block 702 of the method 700 in FIG. 7, the method may include receiving, based on data captured by a LIDAR system of a vehicle, a first point cloud. store data indicating a first location where a first portion of the vehicle is included within the first point cloud. Block 704 of the method 700 may include receiving, based on data captured by the LIDAR system, a second point cloud. Block 706 of the method 700 may include comparing a second location of the first portion of the vehicle included within the second point cloud to the first location of the first portion of the vehicle included within the first point cloud. Block 708 of the method 700 may include calculating a distance between the first location and second location. Block 710 of the method 700 may include performing, based on the distance being greater than a threshold amount, an action.

In some embodiments, the action includes at least one of: providing a warning to a user, turning off the LIDAR system, filtering out subsequent data received from the LIDAR system, or storing the distance between the first location and second location. In some embodiments, the first location where the first portion of the vehicle is included within the first image is obtained by performing edge detection on the first image.

In some embodiments, the method 700 may also include receiving a first image captured by a first camera of the vehicle. The method 700 may also include locating a first feature associated with a first portion of the vehicle in the first image. The method 700 may also include receiving a second image captured by the first camera. The method 700 may also include locating the first feature associated with the first portion of the vehicle in the second image. The method 700 may also include calculating a distance between the first location of the first feature in the first image and the second location of the first feature in the second image. The method 700 may also include performing, based on the distance being greater than a threshold amount, an action.

In some embodiments, the method 700 may also include receiving a third image captured by a second camera of the vehicle. The method 700 may also include locating a second feature associated with a second portion of the vehicle in the third image. The method 700 may also include receiving a fourth image captured by the second camera. The method 700 may also include locating the second feature associated with the second portion of the vehicle in the fourth image. The method 700 may also include calculating a distance between the second feature in the third image and the second feature in the fourth image. The method 700 may also include performing, based on the distance being greater than a threshold amount, an action.

In some embodiments, the method 700 may also include receiving, from the first camera of the vehicle, a third image captured by the first camera at a first time. The method 700 may also include identifying a first location of an object within the third image. The method 700 may also include receiving, from the first camera, a fourth image captured by the first camera at a second time, where the second time is after the first time. The method 700 may also include identifying a second location of the object within the fourth image. The method 700 may also include determining, based on a direction of travel of the vehicle, a first vector representing a directional difference between the first location of the object in the third image and an expected location of the object in the fourth image. The method 700 may also include comparing the first vector to a second vector representing a directional difference between the first location of the object in the third image and the second location of the object in the fourth image. The method 700 may also include calculating a difference between the first vector and second vector. The method 700 may also include performing, based on difference being greater than a threshold amount, an action.

Figure 8:
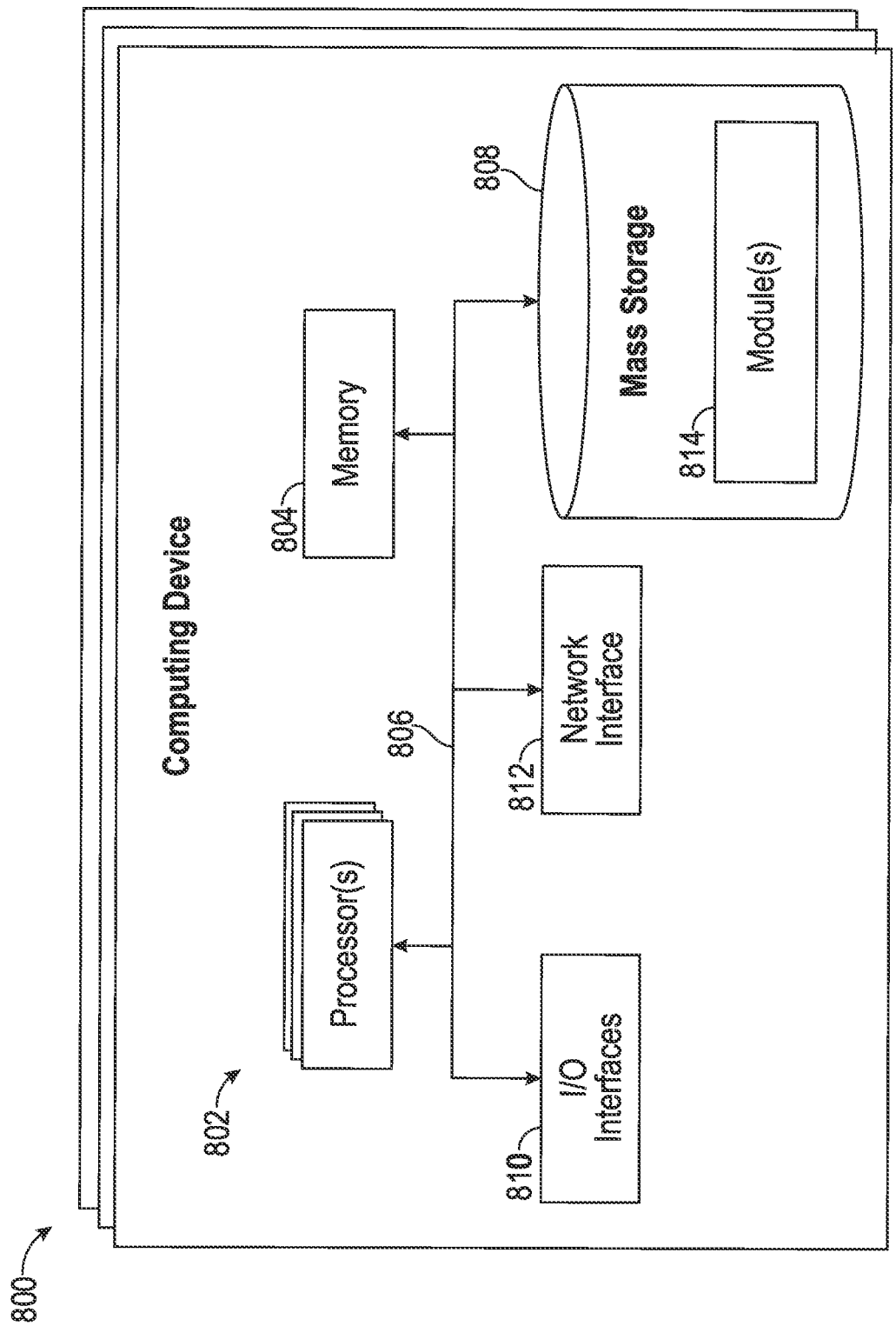
FIG. 8 depicts a schematic illustration of an example computing device architecture, in accordance with one or more example embodiments of the disclosure.

FIG. 8 illustrates an example computing device 800, in accordance with one or more embodiments of this disclosure. The computing 800 device may be representative of any number of elements described herein, such as any of the controllers, and/or any other element described herein. The computing device 800 may include at least one processor 802 that executes instructions that are stored in one or more memory devices (referred to as memory 804). The instructions can be, for instance, instructions for implementing functionality described as being carried out by one or more modules and systems disclosed above or instructions for implementing one or more of the methods disclosed above. The processor(s) 802 can be embodied in, for example, a CPU, multiple CPUs, a GPU, multiple GPUs, a TPU, multiple TPUs, a multi-core processor, a combination thereof, and the like. In some embodiments, the processor(s) 802 can be arranged in a single processing device. In other embodiments, the processor(s) 802 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) portion; and parallel computing portions with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 802 can access the memory 804 by means of a communication architecture 806 (e.g., a system bus). The communication architecture 806 may be suitable for the particular arrangement (localized or distributed) and type of the processor(s) 802. In some embodiments, the communication architecture 806 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Interface Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), moveable RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 804 also can retain data.

Each computing device 800 also can include mass storage 808 that is accessible by the processor(s) 802 by means of the communication architecture 806. The mass storage 808 can include machine-accessible instructions (e.g., computer-readable instructions and/or computer-executable instructions). In some embodiments, the machine-accessible instructions may be encoded in the mass storage 808 and can be arranged in components that can be built (e.g., linked and compiled) and retained in computer-executable form in the mass storage 808 or in one or more other machine-accessible non-transitory storage media included in the computing device 800. Such components can embody, or can constitute, one or many of the various modules disclosed herein. Such modules are illustrated as modules 814. In some instances, the modules may also be included within the memory 804 as well.

Execution of the modules 814, individually or in combination, by at least one of the processor(s) 802, can cause the computing device 800 to perform any of the operations described herein (for example, the operations described with respect to FIG. 5-7, as well as any other operations).

Each computing device 800 also can include one or more input/output interface devices 810 (referred to as I/O interface 810) that can permit or otherwise facilitate external devices to communicate with the computing device 800. For instance, the I/O interface 810 may be used to receive and send data and/or instructions from and to an external computing device.

The computing device 800 also includes one or more network interface devices 812 (referred to as network interface(s) 812) that can permit or otherwise facilitate functionally coupling the computing device 800 with one or more external devices. Functionally coupling the computing device 800 to an external device can include establishing a wireline connection or a wireless connection between the computing device 800 and the external device. The network interface devices 812 can include one or many antennas and a communication processing device that can permit wireless communication between the computing device 800 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A vehicle comprising:
    a computer processor operable to execute a set of computer-readable instructions; and
    a memory operable to store the set of computer-readable instructions operable to:
        receive a first image captured by a first camera of the vehicle;
        locate a first feature associated with a first portion of the vehicle in the first image;
        receive a second image captured by the first camera;
        locate the first feature associated with the first portion of the vehicle in the second image;
        calculate a first distance between the first feature in the first image and the first feature in the second image;
        receive a third image captured by a second camera of the vehicle;
        locate a second feature associated with a second portion of the vehicle in the third image;
        receive a fourth image captured by the second camera;
        locate the second feature associated with the second portion of the vehicle in the fourth image;
        calculate a second distance between the second feature in the third image and the second feature in the fourth image; and
        perform, based on the first distance or the second distance being greater than a threshold amount, an action.

2. The vehicle of claim 1, wherein the vehicle is an autonomous vehicle.

3. The vehicle of claim 1, wherein the action includes at least one of: providing a warning to a user, turning off the first camera, filtering out subsequent images or videos received from the first camera, or storing the first distance and the second distance.

4. The vehicle of claim 1, wherein the instructions operable to locate the first feature include instructions to perform edge detection on the first image.

5. The vehicle of claim 1, wherein the computer-readable instructions are further operable to:
    receive, based on data captured by a LIDAR system of the vehicle, a first point cloud;
    store data indicating a third location where the first portion of the vehicle is included within the first point cloud;
    receive, based on the data captured by the LIDAR system, a second point cloud;
    compare a fourth location of the first portion of the vehicle included within the second point cloud to the third location of the first portion of the vehicle included within the first point cloud;

calculate a third distance between the third location and the fourth location; and perform, based on the third distance being greater than a threshold amount, an action.

6. The vehicle of claim 1, wherein the computer-readable instructions are further operable to:

receive a fifth image captured by the first camera at a first time;

identify a first location of an object within the fifth image;

receive a sixth image captured by the first camera at a second time, where the second time is after the first time;

identify a second location of the object within the sixth image;

determine, based on a direction of travel of the vehicle, a first vector representing a first directional difference between the first location of the object in the fifth image and an expected location of the object in the sixth image;

compare the first vector to a second vector representing a second directional difference between the first location of the object in the fifth image and the second location of the object in the sixth image;

calculate a difference between the first vector and the second vector; and perform, based on the difference being greater than the threshold amount, the action.

7. The vehicle of claim 1, wherein the computer-readable instructions are further operable to:

identify occlusion in the first image based on a part of the first portion of the vehicle being included in the first image.

8. A method comprising:

receiving a first image captured by a first camera of a vehicle at a first time, wherein the first camera includes a field of view external to the vehicle;

identifying a first location of an object within the first image;

receiving a second image captured by the first camera at a second time, where the second time is after the first time;

identifying a second location of the object within the second image;

determining, based on a direction of travel of the vehicle, a first vector representing a first directional difference between the first location of the object in the first image and an expected location of the object in the second image;

comparing the first vector to a second vector representing a second directional difference between the first location of the object in the first image and the second location of the object in the second image;

calculating a difference between the first vector and the second vector;

receiving a third image captured by the first camera of the vehicle;

locating a first feature associated with a first portion of the vehicle in the third image;

receiving a fourth image captured by the first camera;

locating the first feature associated with the first portion of the vehicle in the fourth image;

calculating a first distance between the first location of the first feature in the third image and the second location of the first feature in the fourth image; and performing, based on the difference or the first distance being greater than a threshold amount, an action.

9. The method of claim 8, wherein the action includes at least one of: providing a warning to a user, turning off the first camera, filtering out subsequent images or videos received from the first camera, or storing the first location and the second location.

10. The method of claim 8, further comprising:

receiving, based on data captured by a LIDAR system of the vehicle, a first point cloud;

storing data indicating a third location where the first portion of the vehicle is included within the first point cloud;

receiving, based on the data captured by the LIDAR system, a second point cloud;

comparing a fourth location of the first portion of the vehicle included within the second point cloud to the third location of the first portion of the vehicle included within the first point cloud;

calculating a second distance between the third location and the fourth location; and performing, based on the second distance being greater than the threshold amount, the action.

11. The method of claim 8, wherein the vehicle is an autonomous vehicle.

12. The method of claim 11, wherein the first location where the first portion of the vehicle is included within the first image is obtained by performing edge detection on the first image.

13. The method of claim 11, further comprising:

receiving a third image captured by a second camera of the vehicle;

locating a second feature associated with a second portion of the vehicle in the third image;

receiving a fourth image captured by the second camera;

locating the second feature associated with the second portion of the vehicle in the fourth image;

calculating a third distance between the second feature in the third image and the second feature in the fourth image; and performing, based on the third distance being greater than the threshold amount, the action.

14. The method of claim 8, further comprising:

identifying occlusion in the first image or first video based on only a part of the object being included in the first image.

15. A non-transitory computer-readable medium storing computer-executable instructions, that when executed by at least one processor, cause the at least one processor to:

receive, based on data captured by a LIDAR system of a vehicle, a first point cloud;

store data indicating a first location where a first portion of the vehicle is included within the first point cloud;

receive, based on the data captured by the LIDAR system, a second point cloud;

compare a second location of the first portion of the vehicle included within the second point cloud to the first location of the first portion of the vehicle included within the first point cloud;

calculate a first distance between the first location and the second location;

receive a first image captured by a first camera of the vehicle;

locate a first feature associated with a first portion of the vehicle in the first image;

receive a second image captured by the first camera;

locate the first feature associated with the first portion of the vehicle in the second image;

calculate a second distance between the first location of the first feature in the first image and the second location of the first feature in the second image; and perform, based on the first distance or the second distance being greater than a threshold amount, an action.

16. The non-transitory computer-readable medium of claim 15, wherein the action includes at least one of: providing a warning to a user, turning off the LIDAR system, filtering out subsequent data received from the LIDAR system, or storing the first distance and the second distance.

17. The non-transitory computer-readable medium of claim 15, wherein the vehicle is an autonomous vehicle.

18. The non-transitory computer-readable medium of claim 17, wherein the first location where the first portion of the vehicle is included within the first image is obtained by performing edge detection on the first image.

19. The non-transitory computer-readable medium of claim 18, wherein the computer-executable instructions are further operable to:

receive a third image captured by a second camera of the vehicle;

locate a second feature associated with a second portion of the vehicle in the third image;

receive a fourth image captured by the second camera;

locate the second feature associated with the second portion of the vehicle in the fourth image;

calculate a third distance between the second feature in the third image and the second feature in the fourth image; and perform, based on the third distance being greater than the threshold amount, the action.

20. The non-transitory computer-readable medium of claim 18, wherein the computer-executable instructions are further operable to:

receive, from the first camera of the vehicle, a third image captured by the first camera at a first time;

identify a first location of an object within the third image;

receive, from the first camera, a fourth image captured by the first camera at a second time, where the second time is after the first time;

identify a second location of the object within the fourth image;

determine, based on a direction of travel of the vehicle, a first vector representing a first directional difference between the first location of the object in the third image and an expected location of the object in the fourth image;

compare the first vector to a second vector representing a second directional difference between the first location of the object in the third image and the second location of the object in the fourth image;

calculate a difference between the first vector and the second vector; and perform, based on the difference being greater than the threshold amount, the action.

* * * * *